UNITED STATES PATENT OFFICE.

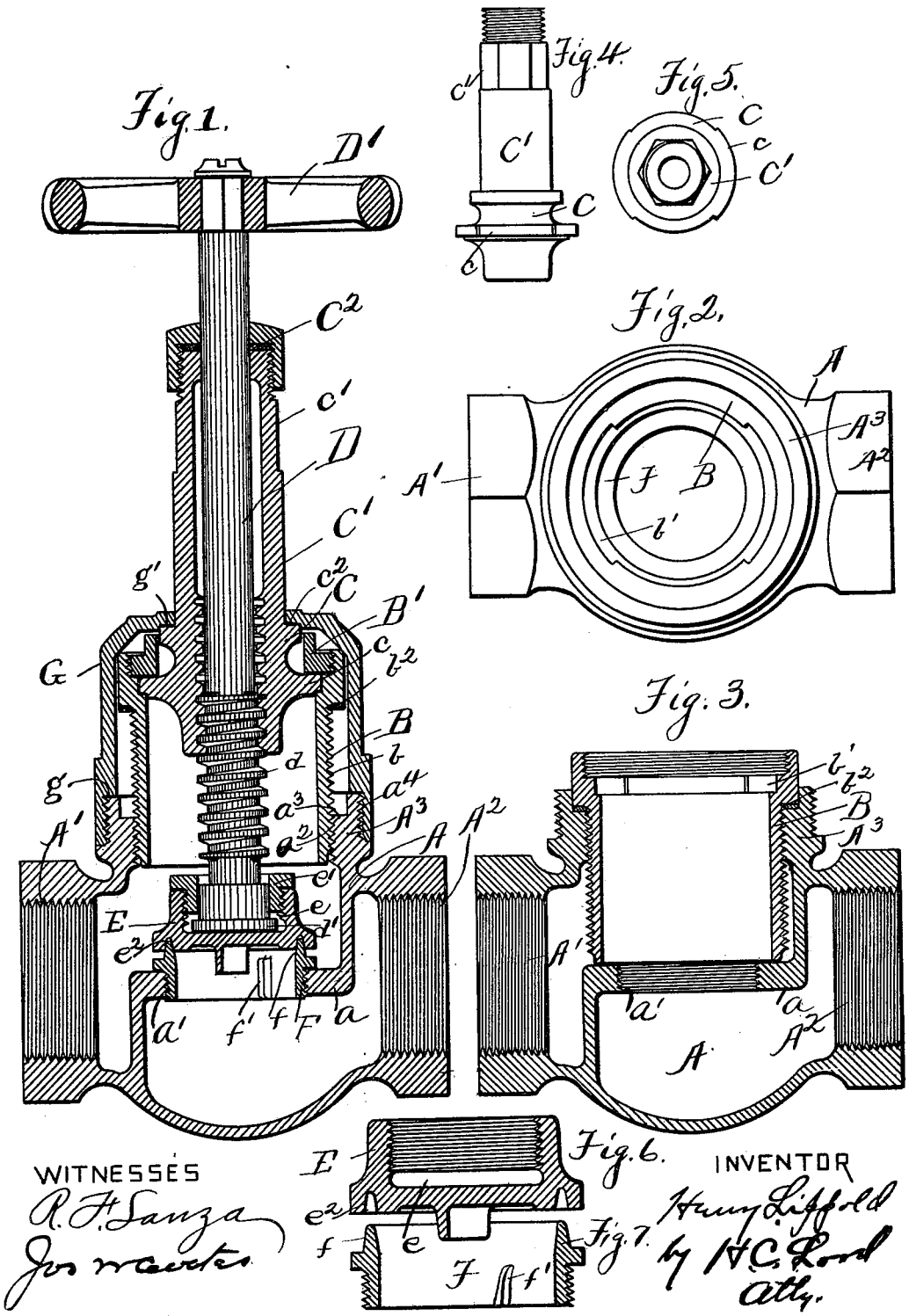

HENRY LIPPOLD, OF ERIE, PENNSYLVANIA.

VALVE.

SPECIFICATION forming part of Letters Patent No. 671,971, dated April 16, 1901.

Application filed June 5, 1900. Serial No. 19,167. (No model.)

*To all whom it may concern:*

Be it known that I, HENRY LIPPOLD, a citizen of the United States, residing at Erie, in the county of Erie and State of Pennsylvania, have invented certain new and useful Improvements in Valves; and I do hereby declare the following to be a full, clear, and exact description of the invention, such as will enable others skilled in the art to which it appertains to make and use the same.

This invention relates to valves; and it consists in certain improvements in the construction thereof, as will be hereinafter fully described, and pointed out in the claims.

The object of the invention is to form a valve in which the seats of the primary valve may be repaired or renewed, while the valve as a whole is subjected to pressure to form an improved seat, as well as other features of construction, which will be fully described, and pointed out in the claims.

The invention is illustrated in the accompanying drawings, as follows:

Figure 1 shows a vertical section through the center of the valve. Fig. 2 shows a plan view of the valve, parts being removed to better show construction. Fig. 3 shows a section similar to Fig. 1 of part of the valve. Fig. 4 shows a view of the nut for operating the primary valve, said nut being reduced from the size shown in Fig. 1. Fig. 5 shows a plan view of said nut. Fig. 6 shows a section through the center of the primary-valve disk. Fig. 7 shows a section of the removable seat.

A marks the valve-chamber, having the inlet A' and outlet $A^2$. A valve-diaphragm $a$ extends through the body of the chamber, as in the ordinary construction. This diaphragm is provided with the screw-threaded opening $a'$, forming the passage through the valve. Extending above the chamber is a projection $A^3$, which is provided with an opening. This opening is provided with the internal screw-thread $a^2$, into which is screwed the secondary valve B. This secondary valve B is provided with the external screw-thread $b$, extending throughout a considerable portion of its length to allow of its movement by being turned in the screw-thread $a^2$. This valve is seated on the top of the diaphragm $a$. The valve is hollow and is of sufficient internal diameter to allow of its movement past the valve-disk E and the removable valve-seat F. On the top of this secondary valve B are the segmental notches $b'$, into which fit the segmental projections $c$ on the nut C. The nut C is provided with the screw-thread, in which the thread $d$ on the stem D of the primary valve operates. The lower end of the stem D is provided with the flange $d'$. This flange is placed in the socket $e$ in the valve-disk E. The socket $e$ is screw-threaded, and the nut $e'$ is screwed into this socket, thus securing the valve-disk to the stem and at the same time allowing the stem to have rotative movement relatively to the disk. A nut B' is screwed into the top of the secondary valve B against the projection $c$ on the end of the nut C, thus locking the nut C both axially and rotatively with the nut B. The nut C is provided with an extension C', which is finished, and at the outer end of this extension there is arranged a squared portion C', on which may be placed a wrench to turn the nut C, and consequently the valve B. The upper end of the nut C is provided with the gland $C^2$ for forming a joint with the stem D. The projection $A^3$ is provided with the external screw-thread $a^4$. A cap-coupling G is screwed onto this screw-thread. The cap is provided with the seat $g$, which is adapted to form a seat with the top of the projection $A^3$. The cap is also provided with a seat at the top $g'$, which is adapted to form a seat with the ring $c^2$ on the nut G when the valve B is screwed to its extreme outer position. A handle D' is provided for operating the primary valve E.

A removable seat-ring F is provided, and this is screwed into the opening $a'$. It has the lug $f'$, by which it may be turned out or screwed into place. The contact portion $f$ or seat proper is V-shaped. The valve-disk is provided with a V-shaped groove $e^2$, which engages the seat $f$.

The operation of the device is as follows: When it is desired to repair, remove, or renew the valve-disk E or the valve-seat $f$, a wrench is placed upon the squared portion C and the valve B is screwed down against the diaphragm $a$. This shuts the valve proper off from the entrance-opening A'. When the valve B has seated itself upon the diaphragm A, it has also formed a seat through a packing $b^2$ upon a seat $a^3$ in the projection $A^3$. The packing $b^2$ has sufficient elasticity to allow a perfect seating of the valve $B^2$ upon the diaphragm A. The only purpose of the seat $b^2$ is to prevent leakage through the threads at the outer edges of the valve. After the valve B is seated the cap G may be removed. This exposes the nut B', which may be removed, and when this is done the nut C, stem D, and valve E may be withdrawn through the opening through the valve B. The valve E may then be repaired or renewed, and, if desired, the seat-ring F may then be removed through the opening in the valve B and a new seat-ring inserted in a similar manner. The parts may be assembled by reversing the above-described operation. After the parts are reassembled the valve E may be kept to its seat, as the valve B is removed by simultaneously turning the handle D' and the nut C, or both valves may be opened together. The valve B is screwed out to a position that presses the seat-ring $c^2$ firmly against the seat $g'$. This insures a closure between the nut C and cap G.

By making the seat $f$ V-shaped and providing the disk with a V-shaped groove a perfect fit can be had with a metallic seat, as any dirt or foreign substance lodging upon the valve-seat is crowded off as the parts are brought to position. Of course the groove and V-shaped portion may be reversed in relation to the disk and seat-ring, if desired, but I prefer the construction shown.

What I claim as new is—

1. The combination of the valve-chamber; a primary valve and a secondary valve, one of said valves being hollow and of sufficient size to allow the removal or insertion of the other through it, said hollow valve being arranged to be moved to and from its closed position in an axial direction.

2. The combination of a valve-chamber; a primary valve; and a secondary valve, said secondary valve having an opening through it large enough to allow the insertion and removal of the primary valve through said opening, said secondary valve being arranged to be moved to and from its closed position in an axial direction.

3. The combination of a valve-chamber; a primary valve; and a secondary valve of annular shape and having an opening through its center large enough to allow the insertion and removal of the primary valve through it, said secondary valve being arranged to be moved to and from its closed position by a movement in an axial direction.

4. The combination of a valve-chamber, having a removable valve-seat therein; a primary valve arranged to operate upon said seat; and a secondary valve having an opening through it of sufficient size to allow the removal of the valve-seat through said opening.

5. The combination of a valve-chamber having a removable seat therein; a primary valve arranged to operate upon said seat; and a secondary valve having an opening through it of sufficient size to allow the removal of said primary valve and said valve-seat through said opening.

6. The combination of a valve-chamber having a removable seat therein; a primary valve arranged to operate upon said seat; and a secondary valve having an opening through it of sufficient size to allow the removal of said valve-seat through said opening, said secondary valve being arranged to be moved to and from its closed position in an axial direction.

7. The combination of a valve-chamber having an inlet and outlet opening; a projection extending therefrom; a secondary valve screwed into said projection and arranged to form a seat in said chamber, said secondary valve having an opening through it; a primary valve arranged within said secondary valve; and means for operating said valve independently for forming a closure.

8. The combination of a valve-chamber having an inlet and outlet; a secondary valve screwed into said chamber and arranged to form a closure therein, said secondary valve having an opening through it; a primary valve of sufficient size to allow of its insertion through said opening; and means for operating said valves.

9. The combination of a valve-chamber; a secondary valve arranged to operate in said chamber and to be moved to and from its closed position in an axial direction; a nut carried by said secondary valve; a primary valve; and a stem for said primary valve arranged to operate in said nut.

10. The combination of a valve-chamber; a secondary valve arranged to operate in said chamber and to be moved to and from its closed position in an axial direction, said secondary valve having an opening through it; a nut carried by said secondary valve; a primary valve of a size to permit of its insertion and removal through the opening in said secondary valve; and a stem operating in said nut for said primary valve.

11. The combination of a valve-chamber; a secondary valve arranged to operate in said chamber; a cap inclosing said secondary valve; a nut carried by said secondary valve, said nut being arranged to seat against said cap; a primary valve; and a stem for operating said nut for said primary valve.

12. The combination of a valve-chamber; a secondary valve arranged to operate in said chamber, said secondary valve having an opening through it; a cap inclosing said secondary valve; a nut extending through said cap, said nut being secured to and locked with said secondary valve; a primary valve; and a stem operating said nut for said primary valve.

13. The combination of a valve-chamber; a secondary valve arranged to operate in said chamber, said secondary valve having an opening through it; a cap inclosing said secondary valve; a nut extending through said cap, said nut being secured to and locked with said secondary valve; a primary valve; a stem operating said nut for said primary valve; and a seat arranged between said nut and said cap.

14. The combination of a valve-chamber, A, having the diaphragm, a, therein; a secondary valve, B, arranged to form a seat upon said diaphragm; the nut, C, secured to said secondary valve; a cap, G, arranged to inclose said secondary valve and to form a joint with the nut, C; the primary valve, E, of such size as to permit of its insertion or removal through the opening in the valve, B; and the stem, D, operating in the nut, C.

In testimony whereof I affix my signature in presence of two witnesses.

HENRY LIPPOLD.

Witnesses:
 H. C. LORD,
 R. F. LANZA.